April 15, 1969 R. CHARBONNIER 3,439,180

INSULATING QUADRIPOLES

Filed Jan. 17, 1967

INVENTOR.
Roger Charbonnier

United States Patent Office 3,439,180
Patented Apr. 15, 1969

3,439,180
INSULATING QUADRIPOLES
Roger Charbonnier, Meudon, Hauts-de-Seine, France, assignor to Societe d'Instrumentation Schlumberger, Paris, France, a corporation of France
Filed Jan. 17, 1967, Ser. No. 609,874
Int. Cl. H02j 3/26
U.S. Cl. 307—17 3 Claims

ABSTRACT OF THE DISCLOSURE

An insulating quadripole is provided which includes a voltage supply transformer interposed between a source of square-wave voltages and two identical groups of circuits each comprising two coupling transformers, the primaries of which are connected in series to the terminals of the secondary of the said supply transformer. The primaries are joined at a common terminal and the secondary of each coupling transformer has a center tap and is associated with a pair of diodes for full-wave rectification of the current through each secondary transformer. Each pair of diodes is connected to a load resistor and a filter capacitor, the polarities of the two pairs of diodes in the same group being opposite to one another. One terminal of a pair of input or output terminals of the quadripole is defined by the junction of the center taps of the secondaries of the coupling transformers of one group and the other terminal is defined by the junction point of the two resistors and the two capacitors of the said one group.

This invention relates generally to an insulating quadripole and, more particularly, to a circuit which has the property of causing the appearance between its output terminals of a difference of potential equal to the difference of potential existing between its input terminals, whatever the common potential of the inputs and outputs and whatever the difference of potential between the said inputs and the said outputs. Such quadripoles are typically employed in D.C. amplifiers wherein the input and output circuits are insulated from one another and with respect to ground.

The differences of potential which it is desired to transfer from the input terminals to the output terminals of such a quadripole are either continuous or slowly time varying. In order to achieve this transfer, it is known to utilize a modulating circuit and a demodulating circuit, to which circuits there is applied an alternating pilot signal. Of course, in order to achieve reconstitution of the polarity or the phase of the input voltage at the output terminals of the quadripole, it is essential that these modulating and demodulating circuits comprise interruptor circuits, the conductive or non-conductive state of which is determined by the phase of the pilot signal. Such modulating and demodulating circuits have been described, for example, in French Patent No. 1,298,448. Many difficulties arise when it is desired that this modulation and demodulation be achived without any phase error. Complex systems requiring delicate compensating adjustments have been used heretofore to obtain this result.

It is an object of this invention to provide an insulating quadripole in which such delicate compensating adjustment is not required.

Another object of this invention is to provide an insulating quadripole in which the controlled interruptor circuits are replaced by simple rectifiers.

According to this invention, an insulating quadripole is provided which includes a voltage supply transformer interposed between a source of square-wave voltages and two identical groups of circuits each comprising two coupling transformers, the primaries of which are connected in series to the terminals of the secondary of the said supply transformer. The primaries are joined at a common terminal and the secondary of each coupling transformer has a center tap and is associated with a pair of diodes for full-wave rectification of the current through each secondary transformer. Each pair of diodes is connected to a load resistor and a filter capacitor, the polarities of the two pairs of diodes in the same group being opposite to one another. One terminal of a pair of input or output terminals of the quadripole is defined by the junction of the center taps of the secondaries of the coupling transformers of one group and the other terminal is defined by the junction point of the two resistors and the two capacitors of the said one group.

By virtue of this arrangement, a continuous or slow time varying voltage which is applied to the input of the insulating quadripole is transferred to the output without any change in amplitude. Such a transfer is effected with a high impedance equal to the value of the insulation of the primary and secondary windings of the coupling transformers (about 1,000 mΩ).

For better understanding of the present invention, together with other and further objects thereof, reference may be had to the following description taken in connection with the accompanying drawings, the scope of the invention being pointed out in the appended claims.

Figure 1:
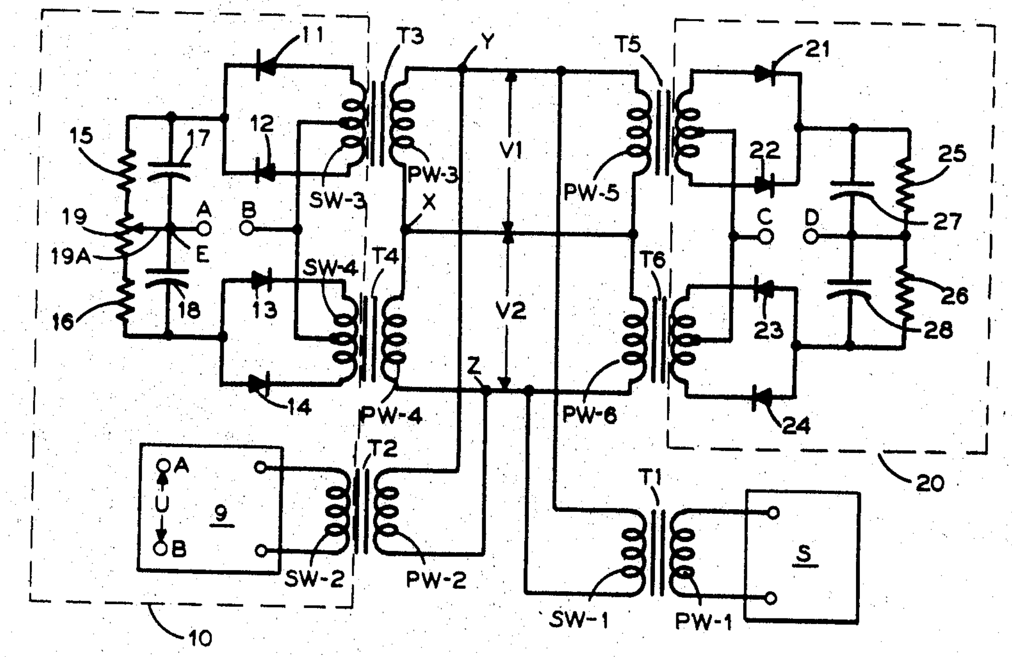
FIGURE 1 is a schematic diagram of an insulating quadripole constructed according to the invention.
Figure 2A:
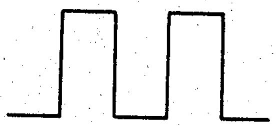
FIGURES 2A, 2B and 2C depict typical pulse shapes which are produced by the quadripole.

Referring to FIGURE 1 the letter S denotes a source, such as an oscillator, for producing output square-wave voltage pulses of constant amplitude and frequency; the shape of these pulses being illustrated in FIGURE 2A. The primary winding PW–1 of a supply transformer T1 is connectced to the terminals of the source S. The secondary winding SW–1 of the transformer T1 is connected to terminals Y and Z which are also connected to the terminals of the primary winding PW–2 of a second voltage supply transformer T2. The secondary winding SW–2 of the transformer T2 is connected to a voltage supply circuit of an apparatus designated generally by the numeral 9. The apparatus 9 produces and delivers a voltage U to a pair of output terminals A and B. The voltage U is usually of unknown magnitude and is to be transferred to a pair of output terminals C and D without a change in magnitude by the system of this invention.

Between the terminals Y and Z there are connected in series the primary windings PW–3 and PW–4, respectively, of the coupling transformers T3 and T4, and the primary windings PW–5 and PW–6 of the transformers T5 and T6, respectively. The four transformers T3, T4, T5 and T6 are identical. A junction denoted X is common to all four primaries of these transformers. The secondary windings of the transformers T3, T4, T5 and T6 are center-tapped and the transformation ratio of each tapped half-secondary winding with respect to its primary winding is unity. Two pairs of diodes 11 and 12 and 13 and 14 are connected to the terminals of the secondaries of the transformers T3 and T4, respectively. The cathodes of the diodes 11 and 12 are joined at the same point to which a load resistor 15, of typically 300 ohms, and a filter capacitor 17 are connected. The anodes of the diodes 13 and 14 are joined at the same point to which a load resistor 16 and a D.C. filter capacitor 18 are connected. Between the resistors 15 and 16 there is located a balancing potentiometer 19, having a sliding contact 19A connected to a terminal E formed by the common connection of the two capacitors 17 and 18. This connection point is connected to the output terminal A of the apparatus 9 delivering the voltage U and is, therefore, also designated by the letter A. The center taps of the secondary windings SW–3 and SW–4, respectively, of the transformers T3 and T4 are joined together from a terminal which is connected to the output terminal B of the apparatus 9 and is, therefore, also referred to by the same letter B.

Components designated 21 to 28 inclusive, which are associated with the transformers T5 and T6 form a circuit which is identical to that formed by the connected components 11 to 18, inclusive.

The transformers T2, T3 and T4 are provided with electrostatic shields, not shown, which are joined together and connected to the frame 10 of the apparatus 9 which produces the voltage U. The potential of the frame 10 is indefinite and may, for example, range between +500 volts and −500 volts. Likewise, the electrostatic shields, not shown, provided the transformers T5 and T6 are connected to the frame 20 of the apparatus connected to the output terminals C and D of the quadripole. The potential of the frame is likewise indefinite and may range between +500 volts and −500 volts.

As the source S produces a square-wave voltage of approximately constant amplitude, FIGURE 2A, a square-wave voltage having a constant amplitude of +V volts appears between the terminals Y and Z of the circuit.

The voltages which appear between the terminals X and Y, on the one hand, and the terminals X and Z, on the other hand, are referred to as V1 and V2. Assuming that the potentiometer 19 is set to a null or zero voltage reading and that the four resistors 15, 16, 25 and 26 are exactly equal in resistance value to one another, if the terminals A and B, and the terminals C and D are short-circuited by, for example, the closure of shorting switches, not shown, the circuit of this invention constitutes two direct-current supplies; a continuous or D.C. voltage equal to $V/2$ appearing at the terminals of each of the capacitors 17, 18, 27 and 28 of the circuit. If the short-circuits are removed and assuming that an unknown voltage U appears across the output terminals A and B of the apparatus 9, it is obvious that the voltages at the terminals of the capacitors 17 and 18 become $(V/2+U)$ and $(V/2-U)$, respectively, the sum of the voltages at the terminals of the two capacitors being, of course, unchanged. Under these conditions, the voltage V1 which appears between X and Y is a square-wave voltage of amplitude $V/2+U$ and the voltage V2 is a square-wave voltage of amplitude $V/2-U$. By joining the junction points of the primaries of the coupling transformers T3, T4, T5 and T6 together at X, the voltages present at the terminals of the primaries of the transformers T3 and T4 are transferred to the terminals of the primaries of the transformers T5 and T6. It follows that the voltages at the terminals of the capacitors 27 and 28 are respectively equal to those which appear at the terminals of the capacitors 17 and 18 and, therefore, that the voltage U present between the terminals A and B is transferred without any change of amplitude to the terminals C and D.

For such a circuit to function correctly, it is necessary that the voltage relationship $+V/2-U$ not change sign so that the eight detection diodes may always be correctly biased.

In such a quadripole, the impedance in parallel between the input terminals A and B, on the one hand, and the output terminals C and D, on the other hand, is very large. In fact, it is determined by the losses which occur in the magnetic circuits of the coupling transformers T3 and T4 and T5 and T6, respectively. FIGURE 2C shows the pulse shape of the currents in the coupling transformers for a frequency of 20 kilocycles of the voltage delivered by the source S. As the primary inductance of the coupling transformers is not infinite, the instantaneous current increases during the duration of the square-wave. This determines the parallel impedance of the quadripole.

The insulation impedance between the frame 10 of the apparatus 9 supplying the voltage U and the frame 20 of the apparatus connected between the output terminals C and D of the quadripole is determined by the insulation of the primary and secondary windings of the coupling transformers. This insulation impedance may without difficulty attain a value of 1,000 MΩ.

The series impedance between the terminals A and D, on the one hand, and the terminals B and C, on the other hand, is determined by the resistance values of the resistors 15 and 16 and 25 and 26, respectively.

Figure 2B:
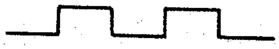
Figure 2C:
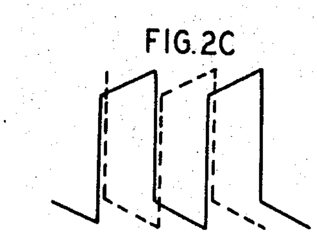

FIGURE 2B shows the difference in the voltages V1 and V2. Such a representation is theoretical since the circuit is not designed to produce this difference in alternating form. The potentiometer 19 constitutes the sole adjustment for the insulating quadripole according to the invention. As related hereinabove, after the terminals A and B are short-circuited and the sliding contact 19A of the potentiometer 19 may be moved in such manner that voltage between C and D is zero.

Moreover, by using a second supply transformer T2, the apparatus delivering the voltage U can be supplied without having to pay attention to the voltage to which this apparatus may be brought.

By way of variation, it is possible to increase the transformation ratio for the transformers T5 and T6 to a value higher than unity, so as to produce an amplifying insulating quadripole.

While there has been described what is at present considered to be preferred embodiment of this invention, it will be obvious to those skilled in the art that various changes and modifications may be made in the instrument without departing from the invention, and it is, therefore, intended to cover all such changes and modifications as fall within the true spirit and scope of the invention.

What is claimed is:

1. Apparatus for transferring a voltage from a pair of input terminals to a pair of output terminals including a source for producing voltage pulses of constant amplitude and frequency and means coupled to said voltage pulse source for receiving pulses therefrom and supplying an input voltage to the apparatus through a pair of output terminals, the improvement comprising: first and second sets of plural coupling transformers including individual primary windings having two ends, one end of said individual primary windings being joined at a common node, said coupling transformers also including secondary windings flux-coupled to said individual primary windings, means series-connecting the other ends of the primary windings of said coupling transformers to said voltage pulse source, means for tapping off voltage from secondary windings of each set of transformers and terminating at first input and first output terminals for the respective first and second sets of coupling transformers, the first input terminal connected to receive voltage from an output terminal of the input voltage supplying means and said first output terminal serving as an output terminal for the apparatus, means for rectifying the voltage across the secondary windings of each set of coupling transformers and respectively terminating as second input and second output terminals for respective first and second sets of coupling transformers, and means for connecting the second input terminal to the other output terminal of said input voltage supplying means.

2. The apparatus as claimed in claim 1, wherein voltage dividing means is coupled between said rectifying means and the first input and first output terminals for applying the voltage from said secondary windings of said first and second sets of coupling transformers to said first input terminal and said first output terminal, respectively.

3. The apparatus as claimed in claim 2, wherein said voltage dividing means for said first set of coupling transformers comprises two series-connected resistors having equal ohmic values, a potentiometer connected in series between said resistors and, means for connecting first input terminal to said potentiometer so as to provide the same voltage across said second output terminals of said second set of transformers as is across said first input terminals of said first set of transformers.

References Cited

UNITED STATES PATENTS 3,025,454 3/1962 Malsbary ---------- 323—48 X

ROBERT K. SHAEFER, *Primary Examiner.*

H. J. HOHAUSER, *Assistant Examiner.*

U.S. Cl. X.R.

307—151